(12) United States Patent
Yoneda et al.

(10) Patent No.: US 6,725,598 B2
(45) Date of Patent: Apr. 27, 2004

(54) PLANT CULTIVATOR AND CONTROL SYSTEM THEREFOR

(75) Inventors: Kenji Yoneda, Kyoto (JP); Yoshio Sugishima, Kyoto (JP)

(73) Assignee: CCS Inc., Kyoto (JP)

( * ) Notice: Subject to any disclaimer, the term of this patent is extended or adjusted under 35 U.S.C. 154(b) by 0 days.

(21) Appl. No.: 10/188,970

(22) Filed: Jul. 5, 2002

(65) Prior Publication Data

US 2003/0005626 A1 Jan. 9, 2003

(30) Foreign Application Priority Data

| Jul. 5, 2001 | (JP) | ................................. 2001-205465 |
| Jun. 7, 2002 | (JP) | ................................. 2002-166850 |

(51) Int. Cl.⁷ .............................................. A01G 9/18
(52) U.S. Cl. ................................................ 47/60; 47/61
(58) Field of Search .............................. 47/60, 61, 17

(56) References Cited

U.S. PATENT DOCUMENTS

| 3,424,231 A | * | 1/1969 | Truhan ..................... 165/230 |
| 4,464,658 A | * | 8/1984 | Thelen .................... 340/825.5 |
| 4,543,744 A | * | 10/1985 | Royster ...................... 47/17 |
| 4,646,293 A | * | 2/1987 | Okada et al. ................. 370/85 |
| 4,701,415 A | * | 10/1987 | Dutton et al. ............. 435/286.6 |
| 4,914,858 A | * | 4/1990 | Nijssen et al. ........... 47/1.01 R |
| 4,923,816 A | * | 5/1990 | Heeg et al. ............... 435/303.2 |
| 5,012,609 A | * | 5/1991 | Ignatius et al. .......... 47/1.01 R |
| 5,061,630 A | * | 10/1991 | Knopf et al. .................. 422/99 |
| 5,283,974 A | * | 2/1994 | Graf, Jr. ...................... 47/60 |
| 5,299,383 A | * | 4/1994 | Takakura et al. .......... 47/58.1 R |
| 5,946,852 A | * | 9/1999 | Oram et al. .............. 47/58.1 R |
| 5,946,853 A | * | 9/1999 | Jacobs et al. ................... 47/60 |
| 6,255,103 B1 | * | 7/2001 | Tamaoki et al. .......... 435/303.1 |
| 6,554,450 B2 | * | 4/2003 | Fang et al. ................. 47/17 X |
| 2001/0047618 A1 | * | 12/2001 | Fang et al. ................. 47/65.5 |

FOREIGN PATENT DOCUMENTS

| JP | 01187036 A | * | 7/1989 | ............ A01G/9/24 |

OTHER PUBLICATIONS

Ono et al. 1997. Evaluation of high intensity ligh–emitting diodes as ight source for plant growth. ASAE Meeting Presentation, Minneapolis MN, pp. 1–16.*

* cited by examiner

Primary Examiner—Peter M. Poon
Assistant Examiner—Jeffrey L. Gellner
(74) Attorney, Agent, or Firm—Armstrong, Kratz, Quintos, Hanson & Brooks, LLP

(57) ABSTRACT

An object of the present invention is to provide plant cultivator for research purposes for finding the optimum cultivation environment for plants, using LEDs as light source and a control system therefor. An illumination window 6 is provided in top face 5a of a cabinet body 2 surrounded by thermally insulating walls. In addition, an LED illumination element 16 is arranged in this illumination window 6 and in the vicinity of LED illumination element 16, there is provided LED control means that controls the LED illumination element 16. In addition, in cabinet body 2, there are provided at least some of a growth detection sensor that detects the state of growth of the plants, cultivation environment monitoring means that monitors the cultivation environment of the plants and cultivation environment generating means that generates the cultivation environment; and cultivation environment control means is provided that controls the cultivation environment generating means.

18 Claims, 9 Drawing Sheets

Fig. 10

| TIME (S) | P1a | P1b | P1c | P1d | P1e | ... | P1n |
|---|---|---|---|---|---|---|---|
| 10 | 255 | 255 | 255 | 0 | 255 | | 255 |
| 20 | 0 | 0 | 0 | 255 | 0 | | 0 |
| 30 | 128 | 128 | 128 | 255 | 255 | | 128 |
| 40 | 255 | 255 | 0 | 128 | 128 | | 0 |
| 50 | 255 | 0 | 255 | 0 | 0 | | 255 |
| 60 | 0 | 0 | 0 | 0 | 80 | | 160 |
| 70 | . | . | . | . | . | | . |
| 80 | . | . | . | . | . | | . |

PLANT CULTIVATOR AND CONTROL SYSTEM THEREFOR

BACKGROUND OF THE INVENTION

1. Field of the Invention

The present invention relates to a plant cultivator for research purposes and control system therefor employed in experiments to discover the optimum cultivation environment for plants.

2. Description of the Related Art

Conventionally, in greenhouses or vinyl plastic hothouses, as a method of promoting plant growth, the method is known of providing a device for illumination with light rays using a fluorescent lamp and/or high-pressure sodium lamp.

Fluorescent lamps and high-pressure sodium lamps emit large quantities of light of wavelengths other than the wavelengths that are effective for plant photosynthesis and it is not possible to intensify exclusively light of the wavelengths that are effective for plant photosynthesis.

Consequently, in order to promote plant growth, it is necessary to use a large number of fluorescent lamps or sodium lamps and to control the illumination time; power consumption of these is high and their life is short and means for controlling the rise in greenhouse temperature produced by the heat generated thereby is necessary. For reasons such as this, with conventional systems, installation costs and running costs are considerable. Furthermore, fluorescent lamps are difficult to control since their illuminance drops at low temperature.

Furthermore, there is the inconvenience that when intense light is generated by fluorescent lamps or high pressure sodium lamps, there is strong emission of light of wavelengths other than wavelengths that are effective for cultivation, the effect of which is to produce bacterial pustules on the plants.

In view of the circumstances described above, the problem that the present invention aims to solve consists in the provision of a plant cultivator and control system therefor capable of being controlled to maintain an optimum environment using as illumination device a light source that chiefly emits light of wavelengths that are effective for plant cultivation without generation of heat or non-useful light, which is capable of coping with high-frequency flashing control, which is considered beneficial in promoting plant photosynthesis and yet which is of high durability. It is intended for use as a plant cultivator for experimental studies such as variety improvement or new variety development for businesses such as cultivating plants of high scarcity value or high-class garden plants or for cultivation of seedlings of high-class vegetables and studies aimed at tissue cultivation and, which is of particular concern, finding optimum growth conditions of plants.

In order to solve the above problem, first of all, a cultivator is formed with a cabinet body that is provided with an opening/closing door in a suitable face thereof and is provided with an illumination window on its upper face or a suitable side face, its inner faces, with the exception of this illumination window, being covered by a thermally insulating wall. In addition, the cabinet comprises at least some of a growth detection sensor that detects how the plants are growing, cultivation environment monitoring means that monitors the cultivation environment, comprising at least one of the temperature, humidity and carbon dioxide gas concentration in the vicinity of the plants (within the cabinet) and cultivation environment generating means that generates said cultivation environment and comprises cultivation environment control means that controls said cultivation environment generating means in accordance with information from said cultivation environment monitoring means at a suitable location within the cabinet or outside the cabinet.

In this specification, "carbon dioxide gas" means carbon dioxide gas supplied with the object of promoting plant photosynthesis and the "growth detection sensor" is a general term for sensors or a monitoring camera that detect for example changes of weight and/or changes of biopotential that change in accordance with the growth of a plant.

Also, on the upper face or a suitable side face of the cabinet body, an LED illuminating element is arranged so as to face the illuminating window and LED control means is provided that controls the LED illuminating element, in the vicinity of the LED illuminating element or on a suitable side face of the cabinet.

An LED indicates a light-emitting diode. An LED illumination element means an illumination element formed by assembling in a suitable ratio LEDs of a plurality of types that generate light of optimum wavelength in accordance with the types and growth stage of the plants, a large number of these being arranged on a member such as a panel. Even more specifically, it is constituted by a large number of LEDs of one or more types chosen from red, blue, green, white, infra-red or ultraviolet LEDs in a suitable ratio on a board.

Conveniently a large number of types of illumination elements are provided and the construction is such that these illumination elements can be replaced in accordance with the types and state of growth of the plants.

A light amount sensor may be provided within the cabinet and the LED control means may control the amount of light emitted from the LED illuminating element with reference to the amount of light within the cabinet obtained by the light amount sensor.

A plant cultivator comprising a construction as described above may be constituted by forming the illuminating window of two transparent glass sheets or synthetic resin sheets provided with an intervening space, or of glass or synthetic resin integrally formed provided with an intervening space.

The opening/closing door may be constituted of a double-door structure comprising an inner door and outer door, the inner door being formed of glass sheet or synthetic resin sheet and the inside face of the outer door being constituted as a reflecting surface.

Also, in order to ensure that light emitted from the LED illuminating element effectively strikes the plants, being reflected so that it cannot escape to the outside, and to cut off light rays from outside, the inside of the cabinet body with the exception of the illuminating window is made as a reflective surface, for example a white reflective sheet being stuck on to this reflective surface or this reflective surface being coated with a white reflective paint or constituted of white resin. In this way, light is more effectively reflected.

The cultivation environment monitoring means may comprise a temperature sensor; the cultivation environment generating means may comprise temperature generating means that performs heating or cooling of the interior of the cabinet; and the cultivation environment control means may control heating or cooling by the temperature generating means in accordance with the temperature within the cabinet measured by the temperature sensor.

The cultivation environment monitoring means may comprise a carbon dioxide gas sensor; the cultivation environment generating means may comprise carbon dioxide gas supply means that supplies carbon dioxide gas from a carbon dioxide gas supply port provided in the cabinet; and the cultivation environment control means may control the rate of supply of carbon dioxide gas by the carbon dioxide gas supply means in accordance with the carbon dioxide gas concentration found by the carbon dioxide gas sensor.

The cultivation environment monitoring means may comprise a humidity sensor; the cultivation environment generating means may comprise humidity generating means that humidifies or dehumidifies the interior of the cabinet; and the cultivation environment control means may control the humidification or dehumidification by the humidity generating means in accordance with the humidity within the cabinet found by the humidity sensor.

The temperature generating means may comprise a heater and the heater may be incorporated in the thermally insulating wall of the cabinet body. Heating may be performed using a known panel heater or sheathed heater.

The temperature generating means may comprise cooling means which may be arranged to cool the interior of the cabinet by incorporating suitable cooling means such as electronic cooling means employing a cooling medium circulating pipe or Peltier element in the thermally insulating wall of the cabinet body.

The temperature generating means may comprise a Peltier element and may perform temperature control by cooling or heating the interior of the cabinet by changing the direction of passage of current to this Peltier element.

The humidity generating means may comprise a fin cooled by a Peltier element and dehumidifying means constituted by a drain that drains water formed as dew on this fin to outside the cabinet body, thereby achieving dehumidification of the interior of the cabinet.

The humidity generating means may effect humidification by supplying into the interior of the cabinet a mist from a mist supply port provided in the cabinet.

In this specification "mist" indicates a mist of water vapor supplied with the object of supplementing supply of moisture to the plant and maintenance of humidity within the cabinet.

Furthermore, preferably, in order to disperse the supplied carbon dioxide gas or carbon dioxide gas and mist uniformly by baffling within the cabinet, the interior of the cabinet body is partitioned using a partition member into a cultivation zone and a supply zone linked with the growth zone and comprising means for stirring the air in the interior and the carbon dioxide gas supply port or carbon dioxide gas supply port and mist supply port are constructed so as to open within the supply zone. The stirring means is not restricted solely to effecting stirring by directing the tip of the supply port in the direction of the interior of the partitioned zone so that the supplied gas is made to collide with the partition member but could beneficially include the provision of a fan in the partitioned zone.

SUMMARY OF THE INVENTION

Also, according to the present invention, in a system that controls said plant cultivator by means of a computer connected therewith through a computer network, said computer comprises cultivation environment control data storage means that stores cultivation environment control data for controlling at least one of the carbon dioxide gas concentration, amount of light, temperature and humidity within said cabinet body and cultivator control means that controls sending of data to said LED control means and said cultivation environment control means provided in said plant cultivator in accordance with said cultivation environment control data. In this way, a plurality of plant cultivators connected to a network can be subjected to centralized management and automatic control by a single computer.

Said cultivator control means may be arranged to control said plant cultivator by comparing the cultivation environment detection data detected by said light amount sensor, said temperature sensor and, if necessary, said growth detection sensor and said humidity sensor provided in said plant cultivator with said cultivation environment control data, such as to coincide with said cultivation environment control data.

Also, said cultivation environment control data may be stored in spreadsheet form. In this way, data based on the size and/or coloration of the leaves of the plant whose cultivation environmental conditions are being measured, the thickness of the stem, the height, the size and/or coloration of the flowers and at the size and/or coloration of the fruits or the like can be obtained and cultivation conditions suited to the plant can easily be found by creating new cultivation environment control data in accordance with these and cultivating the plant in accordance therewith.

For the computer network for sending data for controlling said plant cultivator, said computer may employ an access control system of the CSMA/CD (Carrier Sense Multiple Access with Collision Detection) system. Said computer and said plant cultivator may therefore be connected using a network cable such as 10BASE2, 10BASE-T or 100BASE-TX.

BRIEF DESCRIPTION OF THE DRAWINGS

FIG. 10 is a diagram illustrating part of cultivator control data relating to amount of light.

DESCRIPTION OF THE PREFERRED EMBODIMENTS

Figure 1:
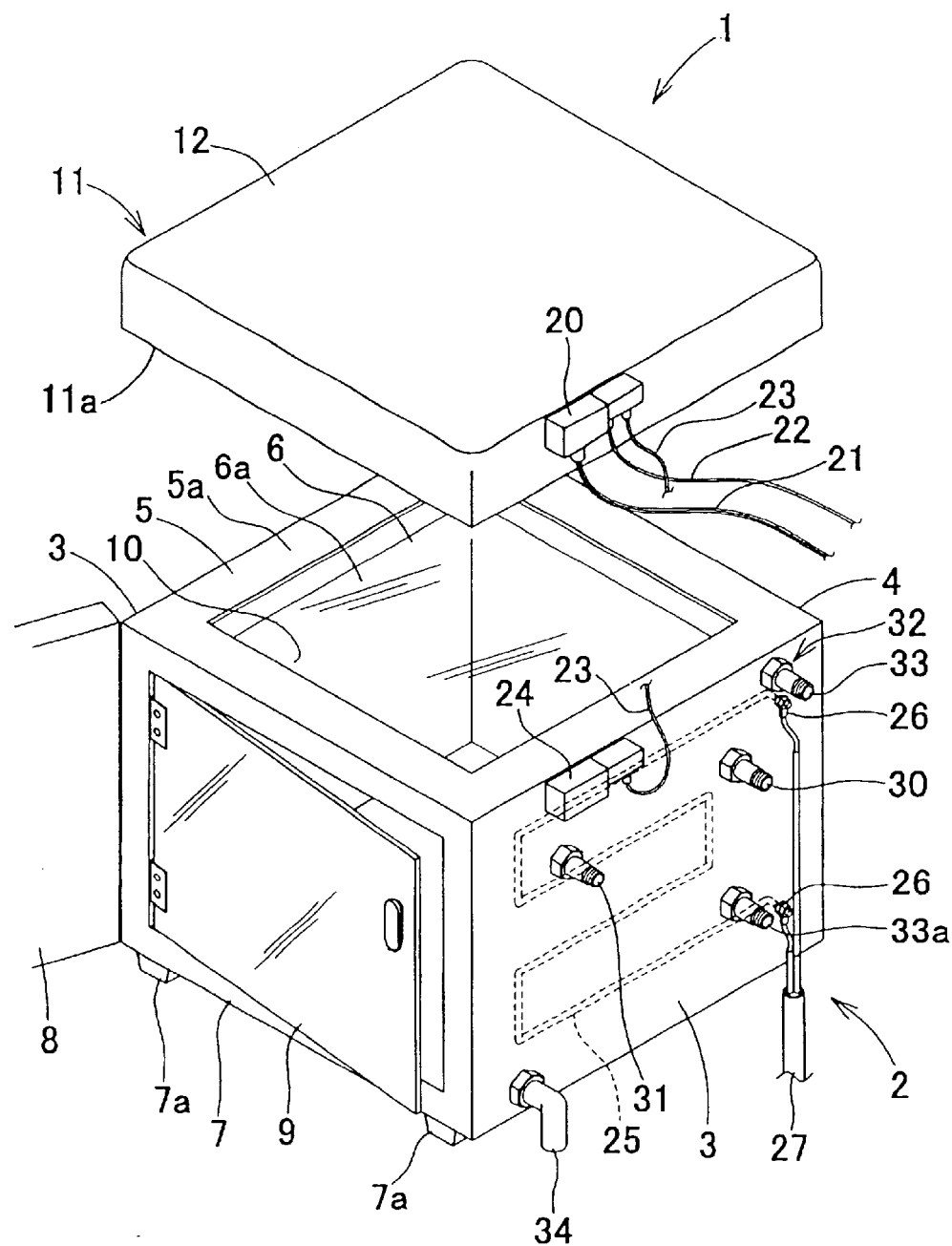
FIG. 1 shows an embodiment of a plant cultivator according to the present invention, being a perspective view seen from the front rightwardly inclined top direction, with the control unit separated from the cabinet body.

An embodiment of the present invention is described in further detail below with reference to the appended drawings; however, the present invention is not restricted to the appended drawings and includes various modes other than as depicted in the drawings.

Figure 2:
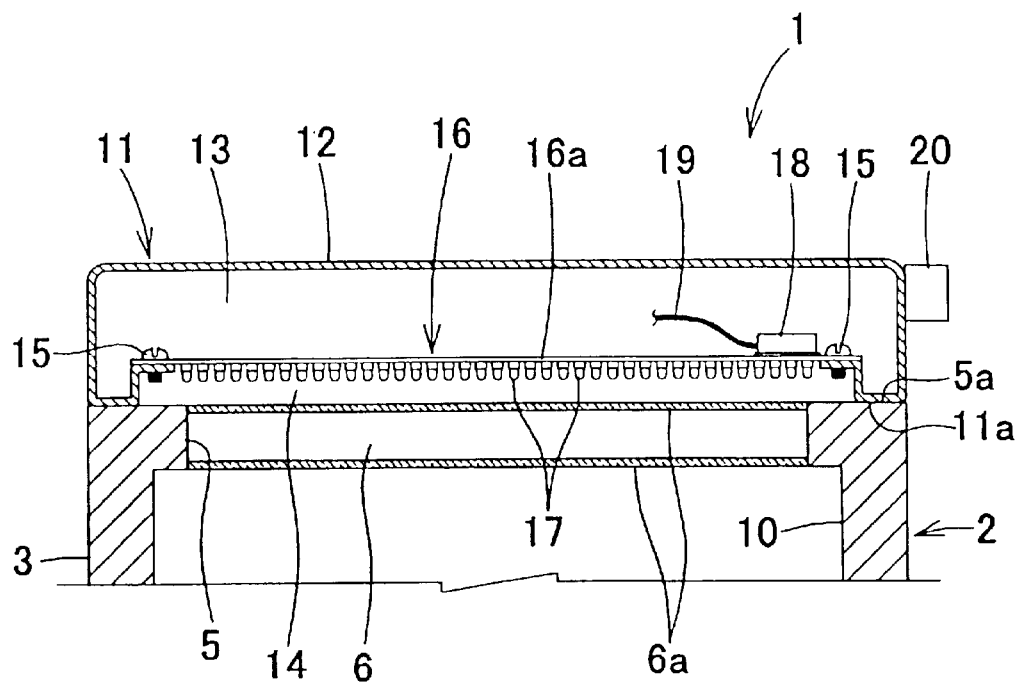
FIG. 2 is a partial view wherein, in the plant cultivator of FIG. 1, the control unit is vertically sectioned in the middle, in a condition arranged above the cabinet body, showing the upper part thereof.

FIG. 1 illustrates an embodiment of a plant cultivator according to the present invention. This Figure is a perspective view seen from a front upwardly inclined direction in a condition with the control unit provided with the cultivation environment control means and LED control means separated. FIG. 2 is a partial view showing the upper portion thereof, with the central vicinity in vertical cross section, in the condition with the control unit of the planned cultivator accorded FIG. 1 arranged on the cabinet body.

Plant cultivator 1 comprises a cabinet body 2 of hermetically sealed box construction having transparent illumination windows 6 in the upper middle and double opening/closing doors 9, 8 on the inside and outside of the front face and a control unit 11 arranged fitting over the top of cabinet body 2. The various surrounding members and outside opening/closing door excluding control unit 11, illuminating windows 6 and transparent inner opening/closing door 9 are formed of thermally insulating sheet and have a white reflecting sheet 10 stuck on to the entire surface on their inner surfaces.

In order to maintain optical transparency and thermal insulation and gas-tightness, illumination window 6 has a double construction in which transparent glass sheets 6a, 6a are mounted; however, instead of glass, it could be made of transparent synthetic resin. Also, illumination window 6 could be of integrally formed synthetic resin with a space provided in the middle thereof being a vacuum or could be of synthetic resin wherein the space provided in the middle thereof is filled with gas of low thermal conductivity.

On the side of control unit 11 facing illumination window 6, illumination element 16 in which are mounted a large number of LEDs 17 on one face of panel 16a so as to cover practically the entire region of illumination window 6 is mounted such that the face where the LEDs are mounted faces illumination window 6, so that the light which is emitted from LEDs 17 is efficiently directed into cabinet body 2 through illumination window 6 from this illumination element. If LEDs having a high degree of directionality are employed, the amount of light directed onto the plants can be maintained constant irrespective of the height of LED illumination element 16.

In the vicinity of the inside face of the inside of the side wall of cabinet body 2, there are embedded a heater 25 for heating the interior of the cabinet and a radiator tube 32 for circulating coolant, their connecting terminals being led to the outside of the wall surface. Also, through the right-hand side wall 3 of cabinet body 2, there are respectively formed supply ports 30, 31 for supplying carbon dioxide gas and mist into cabinet body 2, a drain port 34 which also serves for ventilation, and cable insertion ports (not shown) leading to the outside through which the communication cables 23 of the various sensors arranged within cabinet body 2 are inserted.

Although not shown in FIG. 1 and FIG. 2, within control unit 11, there are provided a power source control device (LED control means) of LED illumination element 16, a rate of supply control device (cultivation environment control means) that adjusts the rate of supply of mist and carbon dioxide gas, control devices of the various sensors and a communication interface.

Next, the detailed construction of the various structural members of plant cultivator 1 described above will be described in order. First of all, cabinet body 2 is formed in a box-type structure by means of a bottom plate 7 from the bottom face of which supports 7a, 7a are formed in projecting fashion so that it is horizontally supported, left and right and rear vertical side walls 3, 3, 4, an upper wall 5 having an illumination window 6 in the middle, and double opening/closing doors 8, 9 on the inside and outside mounted so as to be respectively capable of rotation at the front edges of side walls 3. Respective transparent glass sheets 6a, 6a are mounted at the inside and outside faces of illumination window 6 of upper wall 5 and inner opening/closing door 9 is formed of transparent glass sheet such that the interior can be observed, the construction being such that the interior of the cabinet is hermetically sealed in a condition with opening/closing door 9 closed.

Apart from the inner opening/closing door 9 and glass sheets 6a, 6a of illumination window 6, the members are formed of optically opaque thermally insulating material and the entire cabinet body is constituted by attaching white reflective sheet 10 on the entire surface on the inside surfaces thereof i.e. the inside surfaces of the cabinet. If these are formed of optically opaque thermally insulating material, the benefit is obtained that the internal environment of the cabinet can be controlled to desired conditions since light and heat from outside can be cut off. Also, making the inside surface of the cabinet a reflective surface makes it possible to illuminate the plants efficiently by scattered reflection of the light emitted by LED illuminating element 16.

Making illumination window 6 of a double structure by mounting transparent glass sheets 6a, 6a enables a thermal insulation effect to be obtained which facilitates temperature control within the cabinet and is advantageous in protecting LED illumination element 16 from moisture in the interior thereof. For glass sheets 6a, transparent glass of good transmissivity for the LED light of LED illuminating element 16 may be employed so that the light emitted from LED illuminating element 16 is not attenuated, or instead of using glass, transparent synthetic resin may be employed. Also, in periods where the plants are in a growth stage, ultraviolet light may be necessary; conveniently, quartz class of high ultraviolet transmissivity may be employed for glass sheets 6a and the LEDs of LED illumination element 16 may be of types combined in a suitable ratio with ultraviolet LEDs.

Next, when the door of the cabinet is opened for visual observation of how the plants are growing, the air in its interior is exchanged with outside air, disrupting the cultivation environment, so, in order to avoid this inconvenience, the opening/closing door at the front face of cabinet body 2 is made of an inner and outer double-door construction with the inner opening/closing door 9 being formed of transparent glass sheet. This is convenient in that observation can be performed while maintaining a constant environment. Inner opening/closing door 9 is not restricted to glass sheet and could be made of transparent synthetic resin sheet. Although not shown in the drawings, the door of the cabinet body 2 could be constituted by a single outer door 8 with observation windows made of transparent glass or synthetic resin being provided in a suitable position in outer door 8 or in suitable other wall faces 3, 3, 4.

Preferably the observation window is provided within a suitable shutter function for optical screening on the outside of the observation window in order to cut off entry of light from outside.

Furthermore, opening/closing windows 8 and 9 are not restricted to rotary opening/closing windows as shown and could be opening/closing windows of any other form, such as sliding form or roll-up form.

For example, although not shown in the drawings, if the opening/closing door is of a construction comprising an opening/closing door made of glass or synthetic resin and an optical screen arranged on the inside of this door and comprising a roll-type screen with a known automatic roll-up mechanism mounted so that the screen can be opened/closed along the door, the interior can be observed by opening/closing the screen without opening the door so this is convenient from the point of view of control of the environment in that disturbance of the air within the cabinet (replacement by the atmosphere) during observation and inspection is eliminated.

Next, a white reflecting sheet is stuck onto the inner wall face of cabinet body 2 and the inner wall face of door 8 and/or the inner face of the optical screen of the opening/closing door and shutter of the observation window.

This is convenient in that it has the effect that light emitted from illuminating element 16 is reflected by the wall faces instead of being absorbed by the walls of the cabinet so the efficiency of its absorption by the plants is increased.

These white reflective sheets may be replaced by for example white reflective paint or the inside wall faces may be molded of white synthetic resin.

Also, if paint mixed with a substance such as for example titanium oxide powder having a photocatalytic effect is employed for the white reflective faces, multiplication of bacteria adhering to the reflective faces can be suppressed and the benefit of preserving cleanliness can be obtained since this makes it difficult for dust or contamination to adhere to the reflective faces.

Next, means for supplying carbon dioxide gas or carbon dioxide gas and mist (carbon dioxide gas supply means and humidity generating means) are provided in cabinet body 2. In FIG. 1, carbon dioxide gas supply port 30 and mist supply port 31 are formed through the wall face in the right side wall 3 of cabinet body 2. Carbon dioxide gas may be connected and supplied to a carbon dioxide gas supply port 30 through a hose from a suitable known carbon dioxide gas supply device comprising a separately provided carbon dioxide gas cylinder, regulator, pressure gauge and electromagnetic valve, although not shown in the drawings. As the mist, water vapor mist generated by a known suitable device such as a separately provided ultrasonic mist generator may be connected and supplied to mist supply port 31 through a supply fan, electrically operated opening/closing valve and hose or flexible tube or the like. Conveniently, a drain and discharge port 34 both for ensuring that there is no change in atmospheric pressure within the cabinet body 2 when carbon dioxide gas or mist is supplied and for discharging oxygen produced by photosynthesis of the plants and serving as a means for draining excess moisture is formed in the lower part of a side wall 3 of the cabinet (or in bottom plate 7).

Instead of providing an independent mist supply port 31, this could be combined with the carbon dioxide gas supply port by merging with the carbon dioxide gas supply line (not shown) linked with the carbon dioxide gas supply port 30.

Figure 3:
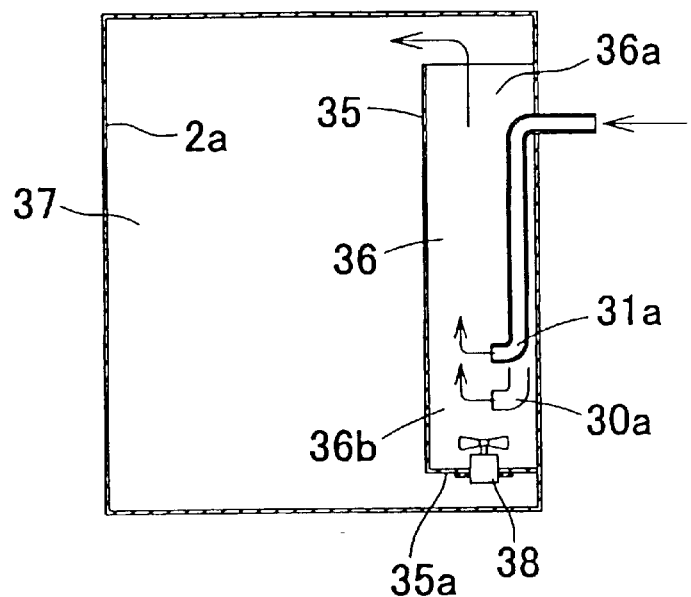
FIG. 3 is a view wherein, in the plant cultivator according to the present invention, the cavity body interior is partitioned into a supply zone and cultivation zone, illustrating an embodiment in which a fan is arranged in the supply zone.

In order to ensure that the supply of carbon dioxide gas and/or mist into cabinet body 2 is moderated and uniformly dispersed within the cabinet, avoiding directly blowing onto the plants, suitable baffling and stirring means such as a partition or a fan are preferably provided within cabinet body 2; a practical example of this is shown in FIG. 3.

FIG. 3 shows the inside from the inner wall surface with cabinet body 2 sectioned vertically; the rectangle hatched with double lines illustrating the outline of the Figure shows inside wall face 2a of cabinet body 2. As shown in the Figure, the interior of cabinet body 2 is partitioned, by a partition member 35, into a cultivation zone 37 and a supply zone 36 provided with a fan 38 for stirring the air in its interior and a linking port 36b linked with the growth zone 37. Mist supply port 31 and carbon dioxide gas supply port 30 have an aperture construction being provided with carbon dioxide gas blowing port 30a and mist blowing port 31a leading to the area immediately in front of fan 38 through piping and the like within supply zone 36. If such a construction is adopted, supplied carbon dioxide gas and mist are stirred and mixed within supply zone 36 by fan 38 before being supplied into cultivation zone 37 from linking port 36a along the direction of the arrow shown in the Figure. If an aperture is provided linked with the fan mounting member (in the case illustrated in the Figure, bottom end member 35a) or growth zone 37 in the vicinity thereof, the air therein can be stirred and made uniform even more effectively.

Although not shown in the Figures, if a construction is adopted whereby gas in the interior is discharged from a separately provided discharge port whilst atmosphere is supplied by means of an air pump or the like into the interior of cabinet body 2, initialization and/or re-establishment of the environment can be performed by a computer without opening the door. It is also possible to make the carbon dioxide gas concentration within cabinet body 2 uniform by employing an air pump for controlling the carbon dioxide gas concentration.

Next, in the case of FIG. 2, the heater constituting the temperature generating means is constructed by a known sheathed heater 25 incorporated in the vicinity of the inside face of the interior of the wall member of right side wall 3 of cabinet body 2 with both ends of power source cable 27 leading from a separately provided heater power source control device (not shown) connected to terminals 26, 26 at both ends thereof. Although not shown in the Figures, this heater 25 could be replaced by a known panel heater or could be replaced by heat supply means constructed so as to circulate heating medium through a radiator tube, the radiator tube being embedded in the interior of a side wall 3, with both ends thereof connected by a hose or the like with a suitable separately provided supply device for heating medium such as hot water. Also, as will be described later, heating and cooling could be performed by a single device by employing temperature generating means using a Peltier element.

Next, in the example illustrated, the cooling means may be constituted by embedding radiator tube 32 in the vicinity of the inside of the interior of rear side wall 4, both ends thereof i.e. cooling medium supply port 33 and return port 33a being led to the outside of cabinet side wall 3 and coolant being circulated through radiator tube 32 by connecting with a suitable separately arranged cooling medium supply device and a hose (neither of which are shown in the Figures). The cooling means is not restricted to that described above and known electronic cooling means employing for example a Peltier element (i.e. thermoelectric cooling element) could be used.

Also, although not shown in the Figures, it would be possible to change to a method of controlling the temperature of the supplied gas by arranging a heating device and/or cooling device in the supply line for the carbon dioxide gas and/or mist. Alternatively, although not shown in the Figures, it would be possible to perform heating, or heating and cooling, of circulating gas by circulating the gas within the cabinet and interposing a heat exchanger at some point along the circulation path.

Figure 4:
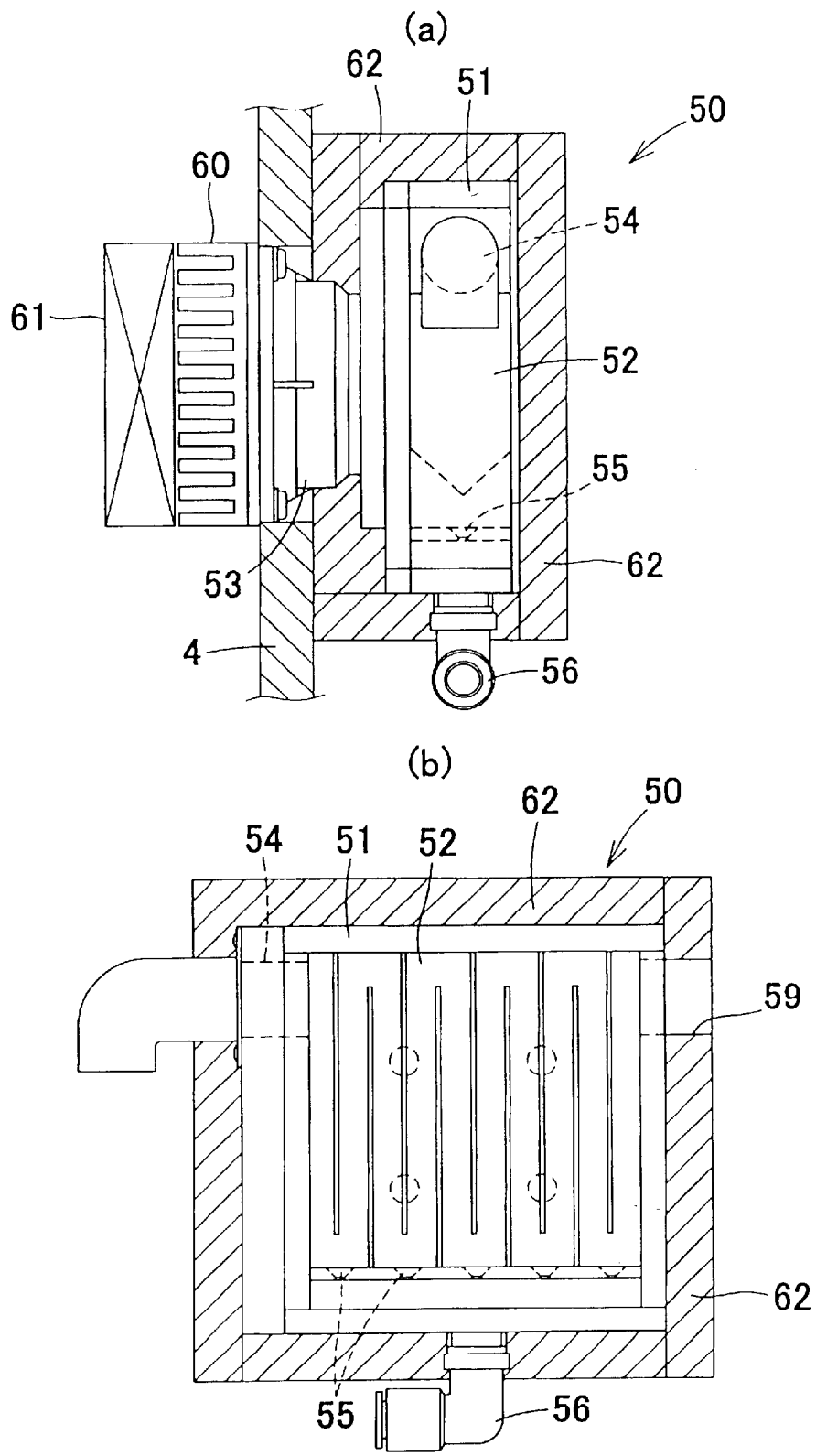
FIG. 4 is a view of a dehumidifier provided within the cabinet body in a plant cultivator according to the present invention.

It could be arranged to perform humidification and dehumidification by providing a dehumidifier (dehumidification means) as shown in FIG. 4 at a suitable location (side wall) within cabinet body 2.

FIG. 4(a) is a view of the side face of dehumidifier 50; FIG. 4(b) is a view seen from the front face in a condition with the cover of dehumidifier 50 removed. In this dehumidifier 50, fins 52 provided within casing 51 are cooled by a cooling unit 53 using a Peltier element so that moisture in the air entering casing 51 from aperture 54 forms dew on fins 52, this water that is thus formed as dew is discharged to below casing 51 from drain hole 55 provided at the bottom of casing 51 and is discharged to outside cabinet body 2 from drain port 56 provided below casing 51; air that has entered casing 51 from aperture 54 is circulated between the fins and discharged from discharge port 59 provided on the opposite side (right-hand side in FIG. 4(b)) to that of aperture 54 and dehumidification is thereby effected.

Since the face on the opposite side (left-hand side in FIG. 4(a)) of cooling unit 53 to that of fins 52 generates heat, a heat radiating plate 60 is provided on the face on the opposite side to that of these fins 52 as well as a fan 61 for cooling this heat radiating plate 60 by blowing air onto it. In this way, this heat is discharged to outside the cabinet so that it does not affect the heat within cabinet body 2. In addition, the effect of temperature regulation within the cabinet produced by dehumidifier 50 can be reduced by providing thermally insulating material 62 around casing 51 and the dehumidifying effect can be raised by lowering the temperature of fins 52.

Figure 5:
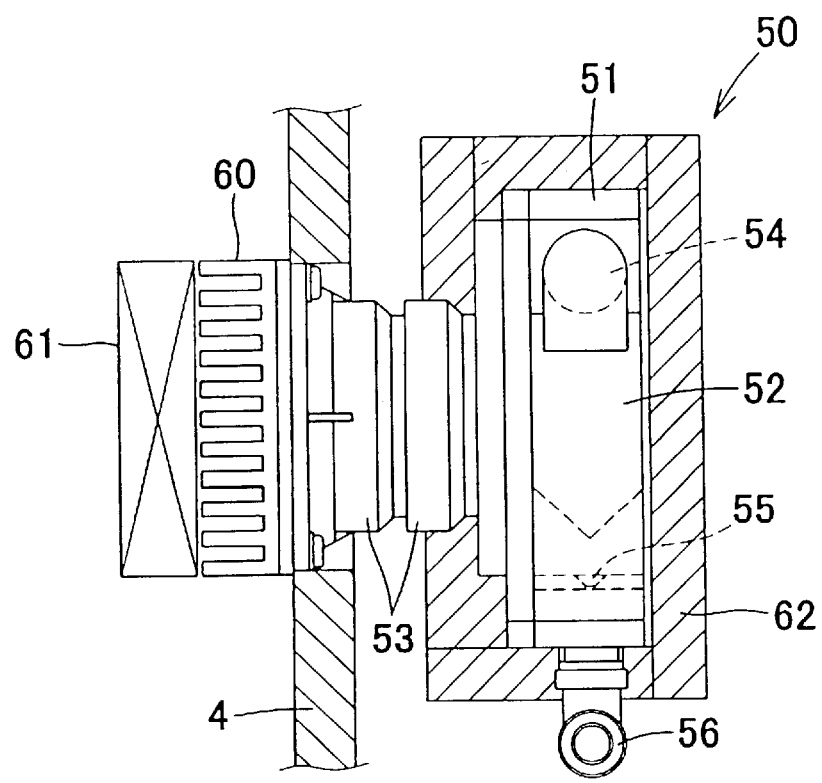
FIG. 5 is a view of a dehumidifier in which multi-stage cooling sections are provided in a plant cultivator according to the present invention.

Also, as shown in FIG. 5, the cooling effect can be increased by further cooling fins 52 by providing multiple Peltier element stages in order to increase the cooling effect of fins 52.

In order to circulate a suitable amount of air from aperture 54 over fins 52, an air inlet/outlet duct may be provided or a fan (not shown) may be provided in the vicinity of aperture 54. The water discharged from drain port 56 may be directly discharged to outside the cabinet or may be used as mist by being accumulated in a tank or the like for re-use as mist.

Preferably fins 52 are cooled to the neighborhood of 0° C. to facilitate dew formation of the moisture in the air. For this purpose, the current value applied to the Peltier element (cooling unit 53) may be controlled by providing a temperature sensor (not shown) in the vicinity of fins 52 or the temperature of fins 52 may be brought to the vicinity of 0° C. by adjusting the rate of air intake from the fan.

In this way, the interior of the cabinet may be humidified using mist or may be dehumidified using a Peltier element, whilst heating, cooling or maintaining the temperature.

Next, within the interior of cavity body 2, although not shown, there are provided a temperature sensor and carbon dioxide gas sensor and alternatively in addition thereto there are provided one or more of a humidity sensor, amount of light sensor and sensor for detecting the state of growth of the plants (i.e. sensors or a monitoring camera that detect change of biopotential or change of weight that change in accordance with plant growth). The signals of these sensors are fed to the outside by inserting insertion ports (not shown) through the side wall and transmitted to control unit 11 through transmission cable 23.

A terminal box 24 for connecting communication cable 23 with a control unit is mounted on the side wall; communication cable 23 relays terminal box 24 and is connected with the sensors within the cabinet through the wires (not shown).

Next, a detailed description of the structure of control unit 11 will be given. Control unit 11 is of planar shape and size practically equal to that of upper face 5a of upper wall 5 of cabinet body 2; in the middle of its underside it is formed with a recess 14 of practically the same shape and size as illumination window 6 in a position facing illumination window 6 in the upper surface of the cabinet body and its peripheral region is provided with a thin box-shaped control unit body 12 with a flat face 11a overlapping with cabinet body top face 5a and is also provided with an LED illumination element 16 removably mounted in this underside recess 14.

Also, a space 13 is formed in the interior of control unit 11. In this space 13 there are accommodated the power source control device of LED illumination element 16, a supply rate control device for adjusting the supply rate of mist and carbon dioxide gas, a control device for the sensors described above and a communication interface (none of these are shown).

Also, at the periphery of control unit 11, there is mounted a centralized terminal box 20 that incorporates a connection terminal for power source cable 21 and connection terminals for communication cable 22 that transmits control signals to the carbon dioxide gas and mist supply device or, in addition, the heater control device and/or coolant supply device and a connection terminal of communication cable 23 that receives signals from the sensors within cabinet body 2. The connection terminals of this centralized terminal box 20 are respectively connected with the LED power source control device accommodated within the control unit, the supply rate control device that adjusts the rate of supply of mist and carbon dioxide gas, the sensor control devices described above and the communication interface.

In LED illumination element 16, in respect of a planar panel 16a, a large number of LEDs 17 are mounted on a surface facing illumination window 6 of cabinet body 2; the electrodes of the individual LEDs 17 are connected to printed circuit type power source circuits formed on the back face of panel 16a and the power source circuits are constituted in integrated fashion with panel connection terminal 18. A lead 19 connected with connection terminal 18 is connected with the LED power source control device referred to above (not shown).

In LED illumination element 16, as described above, a plurality of types of LED of different light emission, (i.e. wavelength) are respectively mounted in a uniform arrangement in a suitable ratio. A number of types of LED illumination element with different LED light-emitting colors and/or combinations and distribution ratio thereof are prepared so that one can be replaced by another depending on the type of plants and/or their stage of growth. A construction is therefore adopted in which the LED illumination element 16 is mounted fitted into recess 14 in such a way that it can be easily mounted or released, using screws 15. Alternatively, the LED illumination element 16 may be inserted into a guide plate such that it can easily be inserted or retracted. Also, although panel 16a of LED illumination element 16 is shown as being of flat plate shape, there is no restriction to a flat plate and it could be made of any suitable shape such as an undulating shape or could be bent to permit adjustment of the direction of optical illumination.

In order to promote plant growth, rather than continuous illumination with light, it is effective to perform panel illumination that flashes repeatedly with a high cycle frequency; this has been confirmed by experiment. For an illumination element whereby such a method of illumination with light can be implemented easily and inexpensively, employment of LEDs is optimal.

LEDs may be said to be an optimal light source for a plant cultivator according to the present invention, since they have excellent characteristics in that LEDs that emit light of various specific wavelengths can be manufactured by altering the constituents of the semiconductor, they can accurately track flashing control with high cycle frequency, they permit control of the amount of light emission by current control, they have long life, and emit light that is unaccompanied by heat with a high efficiency of conversion into optical energy.

The LED power source control device accommodated in the interior of control unit 11 is a device that controls the LED power sources that output to LED illumination element 16 and is capable of controlling the amount of light emitted and the flashing period of illumination element 16 by suitably controlling the LED supply power sources in respect of the currents of LEDs 17 and the power source ON and OFF pulse period as described above, in accordance with instructions from LED output control means (for example a computer or the like) that is arranged at the periphery of control unit 11 or cabinet body 2 or is remotely arranged as a separate item.

Thus, the environment within the cabinet (around the plants) is controlled by supplying mist and carbon dioxide gas into the cabinet by issuing instructions to the supply devices through the mist and carbon dioxide gas supply rate control device of control unit 11 in accordance with signals sent from various sensors within cabinet body 2 in response to changes of environment and state of growth of the plants within cabinet body 2.

Next, heater 25 is controlled by a heater power source control device, not shown, outside cabinet body 2 or arranged separately therefrom and coolant circulation radiator tube 32 is controlled by a coolant supply device, not shown, outside cabinet body 2 or arranged separately therefrom, respectively. That is, the operation and output of the heater and cooling device are controlled by means of control signals supplied through control unit 11 from separate control means in accordance with the signals of respective sensors arranged within the cabinet, so that the temperature within the cabinet can thereby be maintained constant.

Also, a stirring device, as described previously, arranged within the cabinet may be arranged to operate continually during supply of carbon dioxide gas or mist or during operation of the heater or cooling means or, apart from this, to make the environment uniform.

The plants to be cultivated may be suitably arranged by opening opening/closing doors 8, 9 of cabinet body 2 and introducing these into the cabinet from the aperture thereof. Although in the plant cultivator of the present invention the plans to be cultivated were introduced and are arranged in a form planted in a suitable container, since the environmental conditions can be controlled at will, it could be applied to other suitable methods of cultivation such as compost cultivation or water cultivation or employed in all cultivation stages from the seedling stage of various types of plant or up to the mature stage.

The plant cultivator according to the present invention is of a construction that is capable of being controlled by a computer arranged outside through a communication cable 22 and a communication interface (not shown) accommodated within control unit 11; it may be employed on its own or a plurality of these may be provided and a network constructed using a computer arranged in a remote location through communication cable 22 in respect of individual control units 11; centralized management and automatic control may be performed and a mode adapted to large-scale installations may be employed.

Figure 6:
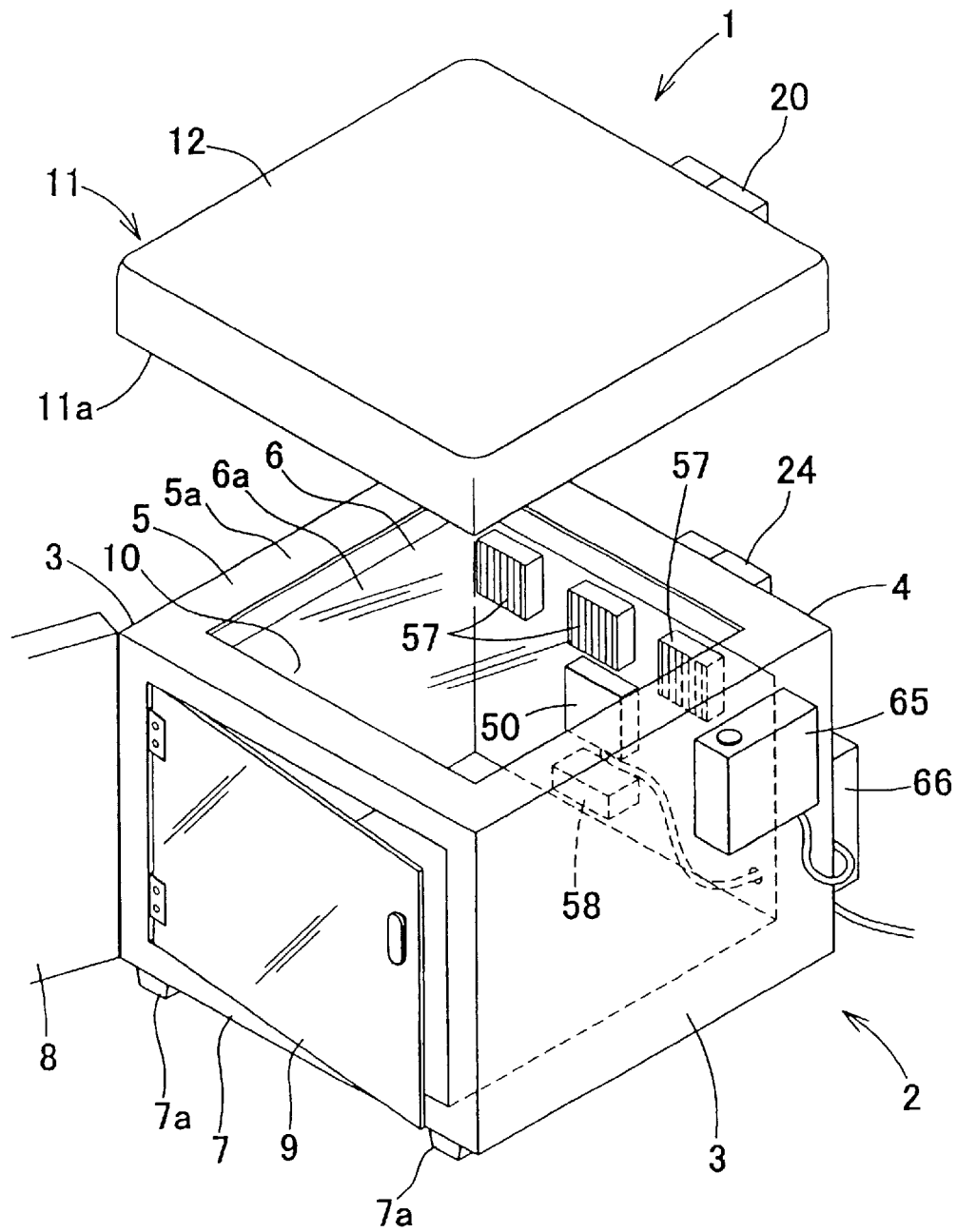
FIG. 6 is a perspective view seen from the front rightwardly inclined top direction of a control unit and cabinet provided with a temperature generating device employing, a Peltier element in a plant cultivator according to the present invention.

Also, apart from methods of heating using heater 25 shown in FIG. 1 and cooling using coolant, as shown in FIG. 6, the interior of plant cultivators 1 could be arranged to be heated and cooled by a single device by providing a temperature generating device 57 using a Peltier element at the rear face (side wall 4) of cabinet body 2.

In plant cultivator 1 shown in FIG. 6, just as in the case of that shown in FIG. 1, there are provided a cabinet body 2 of hermetically sealed box-type construction having inner and outer double opening/closing doors 9, 8 at the front face and a transparent illumination window 6 in the middle of the upper part thereof and a control unit 11 arranged overlapping the upper part of cabinet body 2; in addition, apart from control unit 11, illumination windows 6 and transparent inner opening/closing door 9, the peripheral members and outer opening/closing door are formed of heat insulating sheet and the inner faces of these have white reflective sheet 10 stuck onto the entire surface is thereof. Also, at the side walls 3, 4 of the cabinet, there are provided mist supply devices comprising a mist tank 65 that stores water to be used for mist and an ultrasonic humidifier 66 for generating mist that supplies water supplied from this mist tank to the cabinet in the form of mist by means of ultrasonic waves. At the rear face of cabinet body 2 there are respectively provided a dehumidifier 50 employing a Peltier element to dehumidify the interior of cabinet body 2 shown in FIG. 4, a fan 58 for blowing air into this dehumidifier 50, a temperature generating device 57 that heats or cools the interior of cabinet body 2 and a mist supply port (not shown) that supplies mist from the mist supply device; dehumidification by dehumidifier 50, humidification by the mist supply device and heating and cooling by temperature generating device 57 are performed in accordance with the temperature or humidity measured by temperature sensors and humidity sensors (neither of these are shown) provided within the cabinet. Dehumidifier 50 and the mist supply device are devices as described above; temperature generating device 57 comprises a Peltier element which cools a surface of temperature generating device 57 on the inside of the cabinet by passage of current or, by passage of current in the opposite direction, heats a surface of temperature generating device 57 on the inside of the cabinet, thereby performing temperature adjustment. Specifically, heating and cooling can be performed efficiently by providing fins on the Peltier element. Also, the efficiency of heating and cooling of temperature generating device 57 is raised by providing a ventilation port or the like on the opposite side to the fins for discharging heat generated from the Peltier element to outside the cabinet, so that this heat is discharged to outside the cabinet. Consequently, the time required for setting up the equipment and the method of control or the like can be abbreviated since cooling and heating can be performed by a single device instead of providing respective cooling devices and heating devices.

The drain discharge port 34, communication cables 22, 23, sensor cable connecting terminal box 24, control unit 11 and centralized terminal box 20 provided in control unit 11 and so on that are shown in FIG. 1 and the devices that are not shown in FIG. 1 have practically the same function as those described using FIG. 1.

Figure 7:
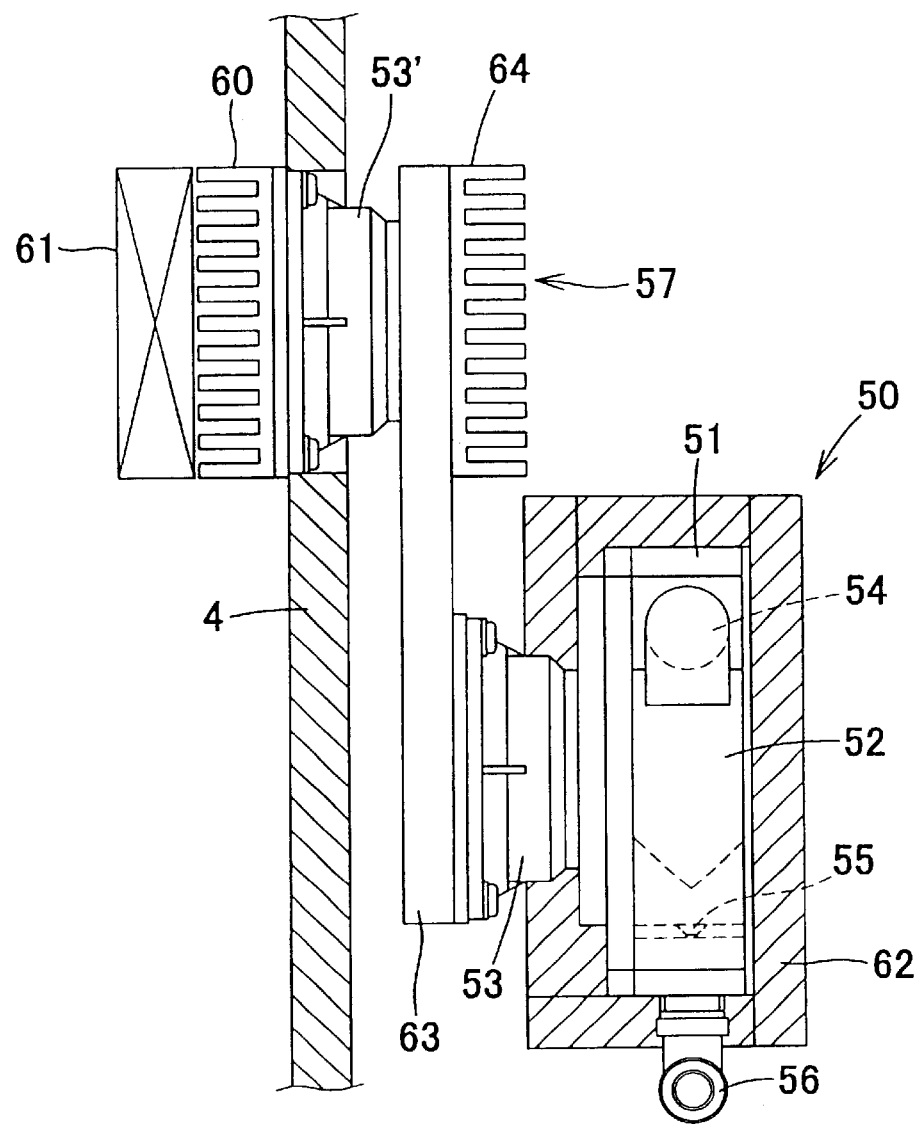
FIG. 7 is a view of an integrated device comprising a temperature generating device and dehumidifier in a plant cultivator according to the present invention.

Also, when temperature generating device 57 is chiefly employed for cooling the interior of the cabinet, as shown in FIG. 7, the temperature generating device 57 and dehumidifier 50 can be linked and integrated using a base plate 63 made of metal of high thermal conductivity such as aluminum. Base plate 63 whereby this dehumidifier 50 and temperature generating device 57 are linked is cooled by a cooling unit 53' using a Peltier element and the fins 64 of temperature generating device 57 and base plate 63 are thus cooled, thereby cooling the interior of the cabinet. Also, base plate 63 and cooling unit 53 employed in dehumidifier 50 are simultaneously cooled. In addition, it can be arranged to increase the cooling effect of cooling unit 53' by providing a heat radiating plate 60 and fan 61 that delivers air thereto in cooling unit 53' on the opposite side (left-hand side in FIG. 7; outside of the cabinet) to that of base plate 63, in order to increase the cooling effect of temperature generating device 57 and the cooling effect of cooling unit 53 of dehumidifier 50.

Figure 8:
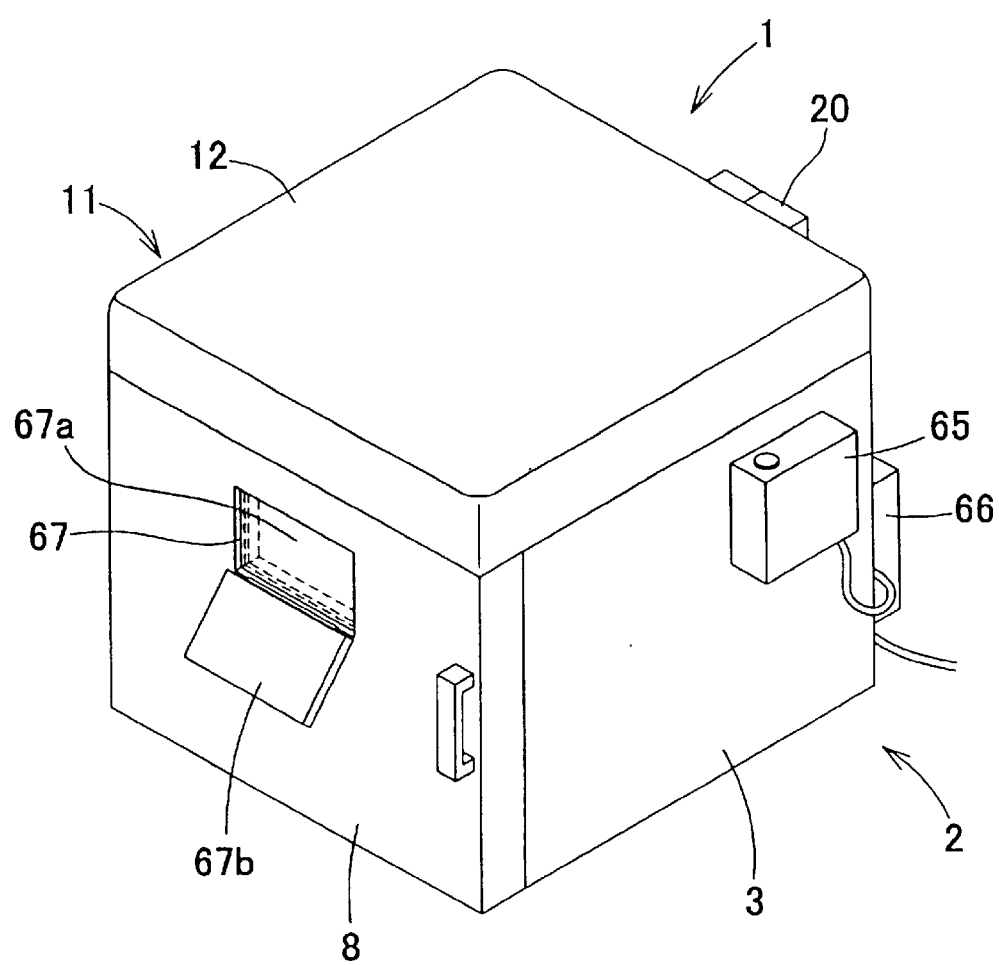
FIG. 8 is a view of a plant cultivator provided with an observation window in an outer opening/closing door in a plant cultivator according to the present invention.

Also, as shown in FIG. 8, in order to observe the state of growth of the plants, an inspection window 67 for observation may be provided in outer opening/closing door 8 so that the state of growth can be observed while reducing changes in the cultivation environment such as changes of temperature. A double construction is adopted for inspection window 67 with transparent glass sheets 67a, 67a mounted therein in order to maintain optical transparency together with a thermally insulating effect and gas-tightness; however, these could be made of transparent synthetic resin instead of glass. Also, a white reflective sheet may be stuck onto the inside face of observation window door 67b (inside face of the cabinet when closed).

Next, a method of control using a computer will be described.

Figure 9:
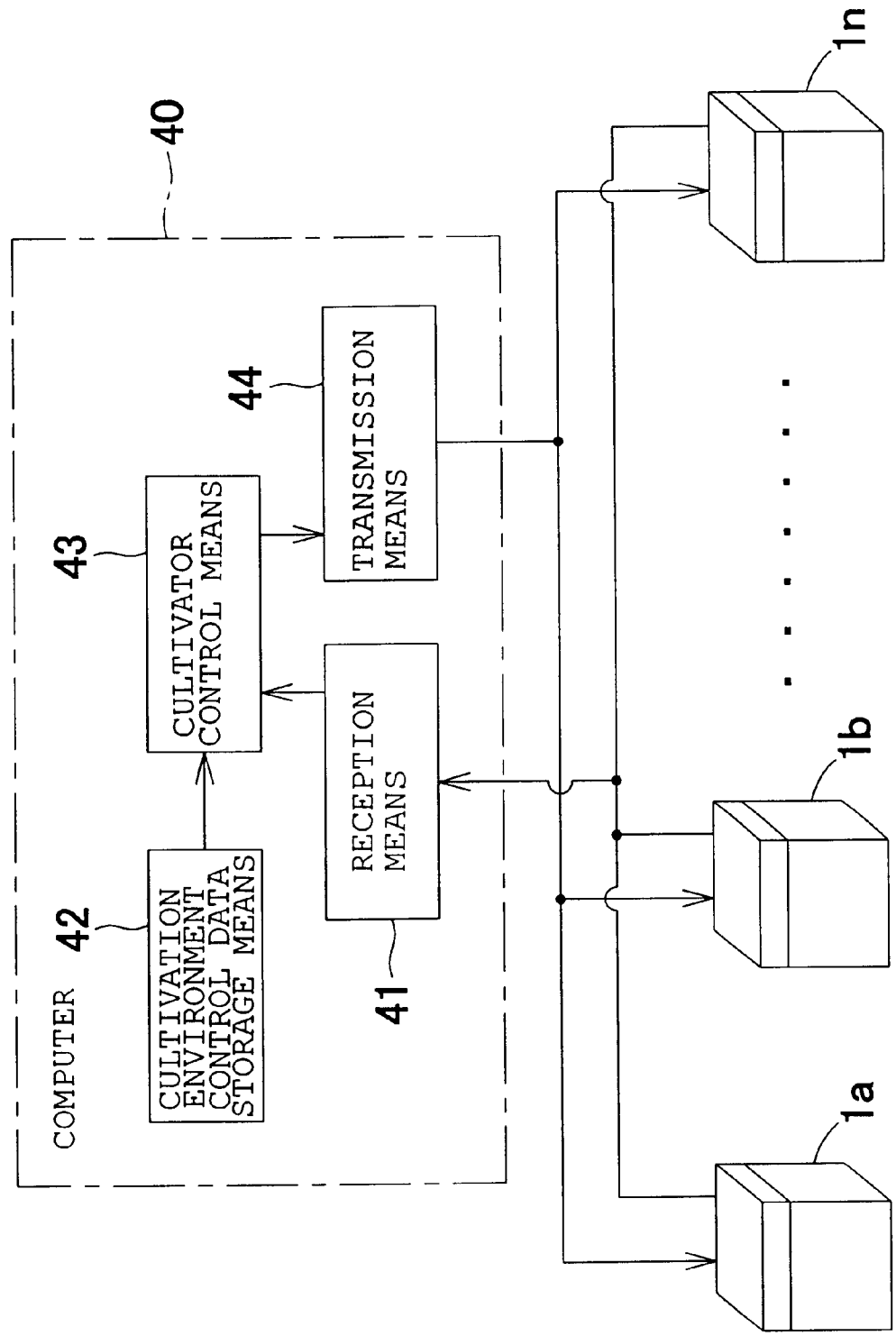
FIG. 9 is a block diagram of a plant cultivator control system whereby control of a plurality of plant cultivators is performed.

FIG. 9 is a block diagram of a plant cultivator control system that performs control of a plurality of plant cultivators; a condition is shown in which computer 40 controls a plurality of plant cultivators 1a, . . . , 1n through a computer network.

Computer 40 comprises reception means 41 that receives cultivation environment detection data such as carbon dioxide gas concentration, amount of light, temperature and humidity detected by the various sensors provided in plant cultivators 1a, . . . , 1n, cultivation environment control data storage means 42 that stores in spreadsheet form cultivation environment control data that controls the rock carbon dioxide gas concentration, amount of light, temperature and humidity within the cabinet, cultivator control means 43 that sends to transmission means 44 control data for controlling the cultivator control means and the LED control means provided in the plant cultivator that compares the cultivation environment detection data and cultivation environment control data such as to achieve coincidence with the cultivation environment control data and transmission means 44 that sends this control data to plant cultivators 1a , . . . , 1n on the computer network. Also, plant cultivators 1a, . . . , 1n are connected with the computer network by using an interface and communication cable 22 accommodated within control unit 11.

Next, the case where the amount of light is controlled by computer 40 will be described. Data controlling the amount of light in the form of a spreadsheet as shown in FIG. 10 is stored in cultivation environment control data storage means 42. Cultivation environment detection data detected by the light amount sensor provided within plant cultivator 1a is received by reception means 41 of computer 40 through the computer network. When cultivation environment detection data is received by reception means 41 it sends this cultivation environment detection data to cultivator control means 43. When the cultivation environment detection data is received by cultivator control means 43, it performs a comparison of this environment detection data and the data stored in cultivation environment control data storage means 42. If these two sets of data match, cultivator control means 43 does not perform transmission of new control data to plant cultivator 1a but, if they do not match, it transmits, using transmission means 44, data of the value of the current (control data) to be applied to LEDs 17 to the LED power source devices (LED control means) accommodated in control unit 11 of plant cultivator 1a. Also, in cases where the amount of light is altered with time by the cultivation environment control data stored in cultivation environment control data storage means 42, when the time designated in respect of the LED power source devices has elapsed, cultivator control means 43 controls the amount of light by using the transmission means 44 to transmit to the LED power source devices data of a light emission pattern adapted to the designated light amount.

In the embodiment described above, cultivator control means 43 performs a comparison of the cultivation environment detection data sent from plant cultivator 1a and the cultivation environment control data; if the result is that these two sets of data match, computer 40 does not send control data for controlling the LED power source device of plant cultivator 1a; if the two sets of data do not match, control data is sent. However, if the light emission pattern emitted from LEDs 17 is to be always kept constant, cultivator control means 43 may send this control data to plant cultivator 1a based on the cultivation environment control data stored in cultivation environment control data storage means 42, without performing a comparison of the cultivation environment detection data and the cultivation environment control data.

If the light emitted from LEDs 17 is altered in accordance with change of time, it may be arranged that when the time designated for the LED power source device has elapsed cultivator control means 43 sends control data to the LED power source device using transmission means 44.

It could be arranged for control unit 11 of plant cultivator 1a to alter the current value applied to LEDs 17 after comparing the data of light amount detected by the light amount sensor with the control data sent from computer 40.

FIG. 10 is a diagram illustrating part of the cultivator control data relating to light amount stored in spreadsheet form in cultivation environment control data storage means 42.

As the cultivator control data, data for controlling LEDs 17 mounted in illumination element 16 are illustrated. The cells in the first row of this spreadsheet indicate the names of data items of the corresponding columns; the column data indicate the "time (s)" indicating in second intervals the time for which control from this cell of the preceding row is to be performed, "P1a" indicating the amount of light in the designated time of illumination element 16 of plant cultivator 1a, "P1b" indicating the amount of light in the designated time of illumination element 16 of plant cultivator 1b, "P1c" indicating the amount of light in the designated time of illumination element 16 of plant cultivator 1c, "P1d" indicating the amount of light in the designated time of illumination element 16 of plant cultivator 1d, "P1e"

indicating the amount of light in the designated time of illumination element 16 of plant cultivator 1e and "P1n" indicating the amount of light in the designated time of illumination element 16 of plant cultivator 1n; the amount of light data relating to all of the illumination elements 16 of all of the plant cultivators 1a, . . . , 1n are stored as data for controlling the amount of light in 256 steps in accordance with numerical values of 0 to 255.

For example, regarding the amount of light of LEDs 17 of plant cultivator 1a, the amount of light from 0 second i.e. at the commencement of control for 10 seconds i.e. up to 10 seconds is represented by the maximum light emission condition of 255; the amount of light from 10 seconds for 20 seconds up to 30 seconds is the no light emission condition of 0; the amount of light from 30 seconds for 30 seconds up to 60 seconds is half the maximum light emission condition i.e. 128 and the amount of light from 60 seconds for 40 seconds i.e. up to 100 seconds is the maximum light emission condition of 255, respectively.

Although in this embodiment the amount of light was arranged to be controlled in 256 steps from 0 to 255, for example when the amount of light is controlled by altering the current applied to LEDs 17 it could be arranged to perform control in arbitrary steps for example so that this can be altered from 0 to 999 in 1000 steps or, in the case where control is performed by light emission or absence of light emission of LEDs 17 it could be arranged to control the amount of light by altering the number of LEDs 17 that emit light or that do not emit light, in accordance with the number of LEDs 17 arranged in this LED illumination element 16. Although it was arranged for the control period of the light amount to become longer at intervals of 10 seconds, for example in the case where the amount of light is controlled at intervals of 30 seconds, it would be possible to alter the interval in which control is effected to an interval of 30 seconds in each case by setting "30" in all of the cells from the second row of the first column onwards or, in the case where the amount of light is controlled by repeating the same data, it would be possible to arrange to alter the light emission pattern cyclically from "10" to "60" by setting specific numbers or letters such as "−1" in the cell of the 8th row of the first column.

Also, although in the case of the cultivator control data shown in FIG. 10 it is arranged for the amount of light to be controlled for each plant cultivator, in cases where two or more types of red LEDs, blue LEDs, green LEDs and white LEDs are provided in LED illumination element 16, it could be arranged to store cultivation environment control data in spreadsheet form such as to control the amount of light for each type thereof and, apart from the amount of light, it could be arranged to store the wavelength and/or duty ratio of the light in spreadsheet form.

That is, when the interval with which the amount of light is changed is altered, only the data of the first column need be altered; when only the amount of light emitted from the LED illumination element 16 of plant cultivator 1a is changed only the data of the second column need be altered; and when the amount of light is controlled for each type of LED, data corresponding to the LEDs may be inserted, so cells in portions where change is not performed can be employed as they stand without alteration, so performance of a complex operation is unnecessary.

Although, in this embodiment, only the amount of light directed onto the plants was illustrated by way of example, in the case of controlling the temperature, cultivator control means 43 may send control data to the cultivation environment control means and this cultivation environment control means may perform control by sending control data to the heater power source control device that controls heater 25 (see FIG. 1) and/or coolant supply device that controls the cooling device or to a temperature generating device control device that controls temperature generating device 57 (see FIG. 6) using a Peltier element.

Also, when humidity and carbon dioxide gas are to be controlled, control to an environment matching the cultivation environment control data may be performed for example by generating mist, supplying carbon dioxide gas or dehumidifying by sending control data to supply rate control devices that adjust the rate of supply of mist and carbon dioxide gas or to a dehumidification control device that controls dehumidifier 50 (see FIG. 6).

The computer network that connects plant cultivators 1a, . . . , 1n and the computer 40 that controls these could be a wired communication type (wired LAN) network such as 10BASE2, 10 BASE-T, or 100BASE-TX using an access control system of the CSMA/CD type, such as Ethernet (registered trademark) or a wireless communication type network using an access control system of the CSMA/CA+ACK (Carrier Sense Multiple Access with Collision Avoidance with Acknowledgement) system (wireless LAN).

With a plant cultivator according to the present invention, cultivation of plants can be performed setting optimum conditions such as light, carbon dioxide gas and humidity in a totally controlled environment space from which sunlight and the effect of atmospheric temperature is cut off; also it is possible to suitably adjust and alter these environmental conditions in accordance with the type of plants and their stage of growth or in accordance with cultivation conditions. It can therefore be utilized for cultivation of plants of all types and is capable of cultivating plants efficiently in a short period.

With the plant cultivator of the present invention, LEDs are employed as the light source for photosynthesis of the plants in a space in which light from outside is totally cut off and pulsed illumination is performed with a high cycle frequency so control of the optimum amount of light and control of a flashing cycle can be performed extremely easily in a manner matching the attributes of the photosynthesis reaction of the plants. Also, since the LED illumination element is separated from the cabinet body, the LEDs cannot be subjected to the effects of humidity in the cabinet, so protecting them from deterioration and prolonging their life. In addition, apart from suppressing rise of temperature within the cabinet, the LED illumination element may be directly cooled by an air cooling fan.

LEDs have the characteristics of high energy efficiency in that they convert electrical current energy solely into light of the specific wavelengths that are effective for plant growth unaccompanied by infra-red rays or light that is not useful for plant cultivation, such as is produced for example in the case of fluorescent lamps, and can track pulsed control and are of high durability. Also, if LEDs of high directionality are employed, illumination can be performed with parallel light, so even if the height of the LED illumination element is changed the amount of light directed onto the plants can be made the same. Furthermore, the amount of heat generated by an illumination element using LEDs is less than that of other illumination elements, making it possible for intense light to be directed onto the plants from an extremely short distance and making it possible to miniaturize the plant cultivator; also, a cooling device needed only be provided that has sufficient capacity to slightly adjust the effects of atmosphere temperature. A plant cultivator with low running costs can thereby be achieved.

Also, since a Peltier element is provided as the temperature generating means, both cooling and heating can be performed by a single device by changing the direction of passage of current; this enables the time required for installation of the equipment to be reduced and/or control to be simplified, making it possible to achieve highly accurate control whilst keeping costs low.

Also, since humidifying means and dehumidifying means based on mist are provided, adjustment to the desired humidity can be easily achieved. Also, since these are provided separately from the temperature generating means, dehumidifying or humidifying whilst heating or dehumidifying or humidifying whilst cooling and the like can be performed.

With the plant cultivator control system according to the present invention, plant cultivators are controlled through a computer network in accordance with cultivation environment control data for controlling carbon dioxide gas concentration, amount of light, temperature, and humidity and so on within a cabinet body, so centralized management and automatic control of a plurality of plant cultivators can be performed.

Also, since the cultivator control means controls the plant cultivators by comparing cultivation environment detection data detected by the growth detection sensor, the light amount sensor, the temperature sensor and the humidity sensor provided in the plant cultivator with cultivation environment control data, such that these coincide with the cultivation environment control data, the environment within the cabinet bodies can be made to be a cultivation environment conforming to the cultivation environment control data independently of the characteristics of the individual plant cultivators.

Since the cultivation environment control data is stored in spreadsheet form, if cultivation environment control data for which good cultivation results were obtained are extracted and alteration is made on the basis of this data, new cultivation environment control data can be compiled without performing a complex operation since there is no need to alter all the data and furthermore data can easily be compared.

Also, since the computer network is a network using an access control system of the CSMA/CD type, equipment such as cables, hubs or repeaters employed in existing LANs (local area networks) such as 10BASE2, 10 BASE-T, or 100BASE-TX can be employed, so the computer and plant cultivators can be connected with low cost.

The plant cultivator according to the present invention is an optimal device not only for businesses such as cultivation of plants having scarcity value and/or high-class garden plants or cultivation of seedlings of high-class vegetables but also for use in research laboratories for product improvement or development of new varieties and in particular for use as a growth cabinet for laboratory use for discovering optimum plant cultivation conditions.

In the latter application, in addition to the benefits of short-period plant cultivation, the plant cultivator according to the present invention may be said to be an optimal device for comparative study of the results of cultivation under different conditions, by using a plurality of cabinets.

What is claimed is:

1. A plant cultivator wherein an opening/closing door is provided in a suitable face of a cabinet body surrounded by insulating walls; an illumination window is provided in the upper face or a suitable side face; an LED illumination element is arranged in said illumination window so as to face said illumination window; LED control means that controls said LED illumination element is provided in a suitable side face of said cabinet or the vicinity of said LED illumination element; and wherein the cabinet comprises
a growth detection sensor that detects the state of plant growth,
cultivation environment monitoring means that monitors the cultivation environment comprising at least one of the temperature, humidity, and carbon dioxide gas concentration around the plants and
a cultivation environment generating means that generates said cultivation environment, and further comprises cultivation environment control means that is provided at an appropriate location for controlling said cultivation environment generating means in accordance with information from said cultivation environment monitoring means;
wherein said growth detection sensor comprises at least one of a sensor detecting a change of plant weight, a sensor detecting a change of bioelectric potential, and a watching camera.

2. The plant cultivator according to claim 1, wherein said LED illumination element is constituted by arranging a multiplicity of one or more types of LEDs selected from red LED; blue LEDs, green LEDs, white LEDs, infra-red LEDs and ultraviolet LEDs in suitable ratios on a board.

3. The plant cultivator according to claim 1 or 2, wherein a light amount sensor is provided within said cabinet and the amount of light that is emitted from said LED illumination element is controlled by said LED control means in accordance with the amount of light within the cabinet obtained by said light amount sensor.

4. The plant cultivator according to claim 1 or 2, wherein said illumination window is formed by two transparent glass sheets or synthetic resin sheets with a space interposed therebetween or by integrally molded glass or synthetic resin with a space defined therein.

5. The plant cultivator according to claim 1 or claim 2, wherein said opening/closing door is formed by an inner door and an outer door, the inner door being formed of transparent glass sheet or synthetic resin sheet and the inner face of the outer door being a reflective face.

6. The plant cultivator according to claim 1 or claim 2, wherein the inside surface of the cabinet apart from said illumination window is constituted as an optically reflecting surface, said reflecting surface being constituted by attaching a white reflective sheet onto the inside thereof or applying white reflective paint thereon or by white resin.

7. The plant cultivator according to claim 1 or claim 2, wherein said cultivation environment monitoring means comprises a temperature sensor, said cultivation environment generating mean, comprises temperature generating means that heats or cools the interior of said cabinet, and said cultivation environment control means controls heating or cooling by said temperature generating means in accordance with the temperature within the cabinet obtained by said temperature sensor.

8. The plant cultivator according to claim 7, wherein said temperature generating means comprises a Peltier element, cooling or heating being performed by this Peltier element.

9. The plant cultivator according to claim 1 or 2, wherein said cultivation environment monitoring means comprises a carbon dioxide gas sensor, said cultivation environment generating means comprises carbon dioxide gas supply means that supply carbon dioxide gas from a carbon dioxide gas supply port provided in said cabinet, and said cultivation environment control means controls the amount of carbon dioxide gas supplied by said carbon dioxide gas supply means in accordance with the carbon dioxide gas concentration found by said carbon dioxide gas sensor.

10. The plant cultivator according to claim 1 or 2, wherein said cultivation environment monitoring means comprises a humidity sensor, said cultivation environment generating means comprises humidity generating means that humidity or dehumidify the interior of said cabinet, and said cultivation environment control means controls humidification or dehumidification by said humidity generating means in accordance with the humidity within the cabinet found by said humidity sensor.

11. The plant cultivator according to claim 10, wherein said humidity generating means increases humidity by supplying mist into the interior of the cabinet from a mist supply port provided in said cabinet.

12. A plant cultivator control system that controls the plant cultivator according to claim 1 or 2 means of a computer connected with the plant cultivator through a computer network, wherein said computer comprises cultivation environment control data storage means that stores cultivation environment control data for controlling at least one of carbon dioxide gas concentration, amount of light, temperature and humidity within said cabinet body, and cultivator control means that performs control by sending data to said cultivation environment control means and said LED control means provided in said plant cultivator in accordance with said cultivation environment control data.

13. The plant cultivator control system according to claim 12, wherein said cultivator control means compares said cultivation environment control data with cultivation environment detection data detected by at least one of said carbon dioxide gas sensor, said light amount sensor, said temperature sensor and said humidity sensor provided in said plant cultivator and controls said plant cultivator so as to match said cultivation environment control data.

14. The plant cultivator control system according to claim 12, wherein said computer network is a network employing a CSMA/CD access control system.

15. The plant cultivator according to claim 1, wherein said humidity generating means comprises dehumidification means comprising a fin cooled by a Peltier element and a drain whereby water formed as dew on this fin is discharged to outside said cabinet body.

16. The plant cultivator according to claim 1, wherein the interior of said cabinet body is partitioned into a growth zone and a supply zone provided with air stirring means in its interior and communicating with said growth zone, said mist supply port and carbon dioxide gas supply port opening into the interior of said supply zone.

17. A plant cultivator wherein an opening/closing door is provided in a suitable face of a cabinet body surrounded by insulating walls; an illumination window is provided in the upper face or a suitable side face; an LED illumination element is arranged in said illumination window so as to face said illumination window; LED control means that controls said LED illumination element is provided in a suitable side face of said cabinet or the vicinity of said LED illumination element; and wherein the cabinet comprises at least some of
a growth detection sensor that detects the state of plant growth,
cultivation environment monitoring means that monitors the cultivation environment comprising at least one of the temperature, humidity, and carbon dioxide gas concentration around the plants and
a cultivation environment generating means that generates said cultivation environment, and further comprises cultivation environment control means that is provided at an appropriate location for controlling said cultivation environment generating means in accordance with information from said cultivation environment monitoring means;
wherein said cultivation environment monitoring means comprises a carbon dioxide gas sensor, said cultivation environment generating means comprises carbon dioxide gas supply means that supply carbon dioxide gas from a carbon dioxide gas supply port provided in said cabinet, and said cultivation environment control means controls the amount of carbon dioxide gas supplied by said carbon dioxide gas supply means in accordance with the carbon dioxide gas concentration found by said carbon dioxide gas sensor; and
wherein said humidity generating means comprises dehumidification means comprising a fin cooled by a Peltier element and a drain whereby water formed as dew on this fin is discharged to outside said cabinet body.

18. A plant cultivator wherein an opening/closing door is provided in a suitable face of a cabinet body surrounded by insulating walls; an illumination window is provided in the upper face or a suitable side face; an LED illumination element is arranged in said illumination window so as to face said illumination window; LED control means that controls said LED illumination element is provided in a suitable side face of said cabinet or the vicinity of said LED illumination element; and wherein the cabinet comprises at least some of
a growth detection sensor that detects the state of plant growth,
cultivation environment monitoring means that monitors the cultivation environment comprising at least one of the temperature, humidity, and carbon dioxide gas concentration around the plants and
a cultivation environment generating means that generates said cultivation environment, and further comprises cultivation environment control means that is provided at an appropriate location for controlling said cultivation environment generating means in accordance with information from said cultivation environment monitoring means;
wherein said cultivation environment monitoring means comprises a carbon dioxide gas sensor, said cultivation environment generating means comprises carbon dioxide gas supply means that supply carbon dioxide gas from a carbon dioxide gas supply port provided in said cabinet, and said cultivation environment control means controls the amount of carbon dioxide gas supplied by said carbon dioxide gas supply means in accordance with the carbon dioxide gas concentration found by said carbon dioxide gas sensor; and
wherein the interior of said cabinet body is partitioned into a growth zone and a supply zone provided with air stirring means in its interior and communicating with said growth zone, said mist supply port and carbon dioxide gas supply port opening into the interior of said supply zone.

* * * * *